United States Patent
Dovek et al.

(10) Patent No.: US 7,170,719 B1
(45) Date of Patent: Jan. 30, 2007

(54) MAGNETIC STORAGE DEVICE WITH FLUX-GUIDED MAGNETORESISTIVE HEAD USING A PERPENDICULAR RECORDING MEDIA

(75) Inventors: Moris M. Dovek, San Jose, CA (US);
G. Herbert Lin, San Jose, CA (US);
Michael McNeil, Nederland, CO (US)

(73) Assignee: Maxtor Corporation, Scotts Valley, CA (US)

( * ) Notice: Subject to any disclaimer, the term of this patent is extended or adjusted under 35 U.S.C. 154(b) by 898 days.

(21) Appl. No.: 09/067,795

(22) Filed: Apr. 28, 1998

(51) Int. Cl.
*G11B 5/127* (2006.01)
*G11B 5/33* (2006.01)

(52) U.S. Cl. ...................... 360/317; 360/126
(58) Field of Classification Search ............. 360/113, 360/126, 119, 121
See application file for complete search history.

(56) References Cited

U.S. PATENT DOCUMENTS

| | | | | |
|---|---|---|---|---|
| 4,423,450 A * | 12/1983 | Hamilton | ................. | 360/111 |
| 4,984,118 A | 1/1991 | Springer | ................. | 360/125 |
| 5,097,371 A * | 3/1992 | Somers | ................. | 360/113 |
| 5,111,352 A * | 5/1992 | Das et al. | ................. | 360/113 |
| 5,434,733 A * | 7/1995 | Hesterman et al. | ......... | 360/113 |
| 5,486,967 A * | 1/1996 | Tanaka et al. | ............. | 360/113 |
| 5,560,097 A * | 10/1996 | Bajhorek et al. | ........ | 360/113 X |
| 5,726,839 A * | 3/1998 | Shinohara et al. | .......... | 360/113 |
| 5,742,457 A * | 4/1998 | Simmons et al. | ........... | 360/113 |
| 2004/0047079 A1* | 3/2004 | Ito et al. | .................... | 360/317 |
| 2004/0218309 A1* | 11/2004 | Seigler | ....................... | 360/313 |

OTHER PUBLICATIONS

Richter, "Longitudinal Recording at 10 to 20 Gbit/inch$^2$ and Beyound," IEEE Transactions on Magnetics, vol. 35, No. 5, Sep. 1999, pp. 2790-2795.
Bertram et al., "SNR and Density Limit Estimates: A Comparison of Longitudinal and Perpendicular Recording," IEEE Transactions on Magnetics, vol. 36, No. 1, Jan. 2000, pp. 4-9.
Ouchi et al., "Overview of Latest Work on Perpendicular Recording Media," IEEE Transactions on Magnetics, vol. 36, No. 1, Jan. 2000, pp. 16-22.

* cited by examiner

*Primary Examiner*—Brian E. Miller

(57) ABSTRACT

The present invention provides a flux-guided head for use in a magnetic recording system, such as a disk drive. The head includes a write element that is capable of writing magnetic polarity transitions into the surface of a magnetic media, such as a magnetic disk, using vertical/perpendicular recording techniques. Further, a read element is provided that includes a magnetoresistive element that, when reading perpendicularly-recorded magnetic transitions from the surface of the magnetic media, produces a readback pulse signal having a substantially Lorentzian pulse shape.

26 Claims, 8 Drawing Sheets

MAGNETIC STORAGE DEVICE WITH FLUX-GUIDED MAGNETORESISTIVE HEAD USING A PERPENDICULAR RECORDING MEDIA

FIELD OF THE INVENTION

The present invention relates generally to a magnetoresistive head for a disk or tape drive storage system and, more particularly, to a flux-guided magnetoresistive head having a configuration that enables perpendicular reading from a magnetic media and that provides a means for magnetically differentiating a readback signal without subjecting the system to signal to noise losses caused by electronic differentiation.

BACKGROUND OF THE INVENTION

Typically, a disk drive system includes a stack of magnetic data storage disks having concentric tracks capable of storing data. A number of read/write transducers or heads, located on actuator arms, are used to communicate with each magnetic data storage disk. The magnetic disks are spun at a high rotational speed causing the transducers to float above the disks on a small cushion of air.

Digital data is written on a disk in the form of magnetic polarity transitions which are induced on the surface of the magnetic disk by a head. The magnetic polarity transitions are written on the magnetic disk by generating a magnetic flux in the head. The magnetic flux induces a magnetic pattern onto the surface of the disk as the disk spins below the head.

In addition to writing data, the head can also be used to read data that has been written on the disk. Reading is performed by sensing a variable magnetic field created by the magnetic pattern on the disk surface as the disk spins. The variable magnetic field is converted to an analog electrical signal that is indicative of the data stored on the disk. This analog electrical signal is commonly called an analog read signal and normally includes a number of readback pulses that each correspond to a single magnetic transition.

As described above, heads are used to write data to and read data from a magnetic media. Some heads, such as a conventional inductive-type head, are capable of performing both functions using a single read/write element. Other heads, known as dual element heads, use separate read and write elements.

Dual element heads are preferable to single element heads because they allow each element to be separately optimized to perform its respective function. For example, a dual element head can utilize a magnetoresistive (MR) read element to perform the reading function. The MR elements are thin strips of magnetoresistive material that have an electrical resistance characteristic that changes with an applied magnetic field. MR elements are more sensitive to small magnetic fields than conventional inductive elements, and therefore, MR elements are preferred over inductive elements for reading data at high disk recording densities.

In the conventional head configuration, shown in FIG. 1, the head 500 includes an MR element 510 as a read element and an inductive write head 530 as a write element. The MR head 500 further includes write coils 535 and shield elements 540. The MR element 510 of MR head 500 is positioned proximate to the surface of rotating magnetic media 520 and is capable of sensing the variable magnetic polarity transitions 525 stored on the magnetic media 520 as the magnetic media 520 is rotated or moved in the direction of arrow A. In addition, MR element 510 is positioned as close to the magnetic media 520 as possible because the amplitude of the readback signal generally increases the closer the MR element 510 is to the media 520.

While dual MR element heads provide certain advantages over inductive heads, the MR head configuration, shown in FIG. 1, is prone to several problems including the problems of thermal asperities, electrostatic discharge and material corrosion. These problems occur, in part, because the MR element 510 is positioned proximate to the magnetic media 520 (in many cases less than a few microinches away) as will be understood by the description of the problems below.

The problem of thermal asperities is well-known in the art. More specifically, the problem is caused by collisions between the head and foreign particles or other aberrations on the surface of the disk. These foreign particles and aberrations are know as asperities. Collisions between the head and the asperities cause the head to heat up. The increase in temperature resulting from the collisions between the asperities and the head causes an increased resistance in the head. Thus, the resulting readback voltage appears to be greater than the voltage that should be present based upon the data stored on the disk. Often, this additive signal exceeds the amplitude of the readback signal. The additive signal resulting from the increase in temperature of the MR element is known as a thermal asperity.

Thermal asperities can cause unwanted increases in bit error rates. In some cases, the increases in bit error rates are so dramatic that severe data losses can result.

In addition, the configuration shown in FIG. 1 is susceptible to the problem of electrostatic discharge due to the generation of an electrostatic potential directly between the MR element 510 and magnetic media 520. When the potential is discharged, the MR head 500 or the MR element 510 may be damaged or destroyed.

Also, the configuration of FIG. 1 may also suffer from the problem of material corrosion. In this configuration, the MR element 510 is directly exposed to chemicals present in the disk drive and chemicals used in the manufacturing processes. These chemicals can corrode the materials used to fabricate the MR element 510. This corrosion may cause damage to the MR element 510 and may result in an inability to retrieve data stored on magnetic media 520.

In an effort to overcome the aforementioned problems, some manufacturers have decided to use yoked MR head structures (see FIGS. 2 and 3). In yoked structures, the MR element is displaced at a distance from the disk surface, embedded in the yoke, and encapsulated in an insulator. A portion of the yoke is placed proximate to the disk surface to effectively "carry" the magnetic flux emanating from the disk to the MR element that is embedded in the yoke. Thus, although the MR element is displaced from the disk surface, the function of the yoke "virtually" places the MR element at the disk surface.

Accordingly, the configurations shown in FIGS. 2 and 3 solve the aforementioned problems. Specifically, with regard to the problem of thermal asperities, the yoke is positioned such that the MR element is recessed and not positioned proximate to the disk surface. As such, the heat that is generated during a collision with an asperity is effectively dissipated in the yoke such that the MR element does not experience the affects of the thermal asperity. With regard to the problem of electrostatic discharge, the MR element is recessed from the disk surface; therefore, an electrostatic potential cannot be generated between the MR element and the disk surface. As such, the risk of discharge is not present. Finally, with regard to the problem of element material corrosion, since the MR element is sealed in an insulator and positioned away from the disk surface, the MR element is not in contact with chemicals used in the manufacturing process or contaminants found in the disk drive. As such, corrosion of the MR element is inhibited.

More specifically, in FIG. 2, a conventional magnetoresistive (MR) head 10 using a yoked geometry is illustrated. The head 10 is used to read information from and write information to a disk 12. Information is written on the disk 12 in the form of longitudinally-recorded magnetic transition data 14. In the conventional geometry shown in FIG. 2, the head 10 includes an MR element 20, a yoke 22, a coil element 24 and a gap 16.

During a read operation, the gap 16 in the yoke 22 senses longitudinally-recorded magnetic transition data 14 on the disk 12 as the disk 12 is rotated or moved in the direction of arrow A. As the longitudinally-recorded magnetic transition data 14 pass the gap 16, the longitudinally-recorded magnetic transition data 14 create a magnetic flux flow within the yoke 22. To sense the flux flow, the MR element 20 is embedded in the flux flow path of the yoke 22. The magnetic flux flow travels through the MR element 20, and thereby varies the resistance of the MR element 20 creating an analog read signal.

During a write operation, a magnetic flux flow is generated in the yoke 22 by energizing coil element 24. When the coil element 24 is energized, a magnetic field is created at the gap 16 which magnetizes the surface of the disk 12 creating longitudinally-recorded magnetic transition data 14.

In FIG. 3, another conventional yoked-head geometry 80 is shown. The head 80 is used only to read information from a disk 86 (i.e., is a read-only head). Information is written on the disk 86 in the form of longitudinally-recorded magnetic transition data 84. The head 80 includes an MR element 82, a flux yoke 88, a gap 87 and a first pole piece 85. As shown in FIG. 3, the MR element 82 is incorporated into the flux yoke 88.

In disk drive or tape drive applications, the magnetic media or disk 86 is rotated or moved in the direction of arrow A'. Like the configuration in FIG. 2, this movement causes longitudinally-recorded magnetic transition data 84 to pass gap 87 and create a magnetic flux flow within the yoke 88. The magnetic flux flow travels through the yoke 88 to the MR element 82 and varies the resistance of the MR element 82 to create an analog read signal.

As mentioned previously, the configurations shown in FIGS. 2 and 3 have advantages over conventional non-yoked head configurations. For example, recessing the MR element 82 from the surface of disk 86 eliminates the problems of thermal asperities, electrostatic discharge and element material corrosion. The head configurations shown in FIGS. 2 and 3, however, suffer from a different problem. More specifically, the readback signal generated by the conventional yoked-head configurations illustrated in FIGS. 2 and 3 during detection or reading of data is a non-ideal pulse signal, as shown in FIG. 4.

In contrast, in most magnetic recording systems, the readback signal generated during a read operation has an ideal pulse shape known as a Lorentzian shape, as shown in FIG. 5. This shape is ideal because it resembles a pulse signal best suited for detection by state of the art detectors. Once delivered to a detector, the Lorentzian-type pulses are read and converted to digital data.

When non-ideal pulse signals are read by conventional yoked MR heads, electronic signal processing techniques must be used to convert the pulse signals into Lorentzian-shaped pulses when partial response like channels are used. For example, the signal shown in FIG. 4 can be converted to a Lorentzian shape by differentiation. The problem with using electronic signal processing techniques is that the signal noise is increased. Also since additional hardware is required to implement the electronic signal processing, such hardware occupies valuable space within the disk drive unit.

Therefore, a need exists for developing a head configuration which possesses the benefits associated with a yoked configuration but also provides a readback signal having substantially Lorentzian-pulse shape without using electronic signal processing. The present invention is designed to overcome the aforementioned problems and meet the aforementioned, and other, needs.

SUMMARY OF THE INVENTION

It is an object of the present invention to provide a head configuration which possesses the benefits associated with a yoked configuration, wherein the head configuration provides a readback signal having a substantially Lorentzian-pulse shape without using electronic signal processing.

In accordance with the present invention, a head for use in a magnetic recording system which includes a magnetic media having perpendicular magnetic polarity transitions is provided. The head may be used for transferring data between the magnetic media and an external environment.

The head includes a write element and a yoke. The write element may be used for inducing perpendicular magnetic polarity transitions into a surface of the magnetic media during a write operation. The yoke, which is disposed within the write element, includes a read gap for sensing the magnetic polarity transitions.

In one aspect of this embodiment, the head may include a magnetoresistive element mounted in a flux flow path of the yoke. The magnetoresistive element typically produces readback pulses having a substantially Lorentzian pulse shape.

In another embodiment of the present invention, a magnetic storage device is provided. The magnetic storage device includes a magnetic media and a read element. The magnetic media includes magnetic polarity transitions that have been perpendicularly recorded thereon. The read element is capable of reading the perpendicular magnetic polarity transitions. In addition, the read element includes a flux guide having a read gap wherein the read gap may be used for sensing the perpendicular magnetic polarity transitions and for producing a magnetic flux in the flux guide. Further, the read element produces a readback pulse having a substantially Lorentzian pulse shape.

Other objects, features and advantages of the invention will be apparent from the following specification taken in conjunction with the following drawings.

DETAILED DESCRIPTION

Figure 11:
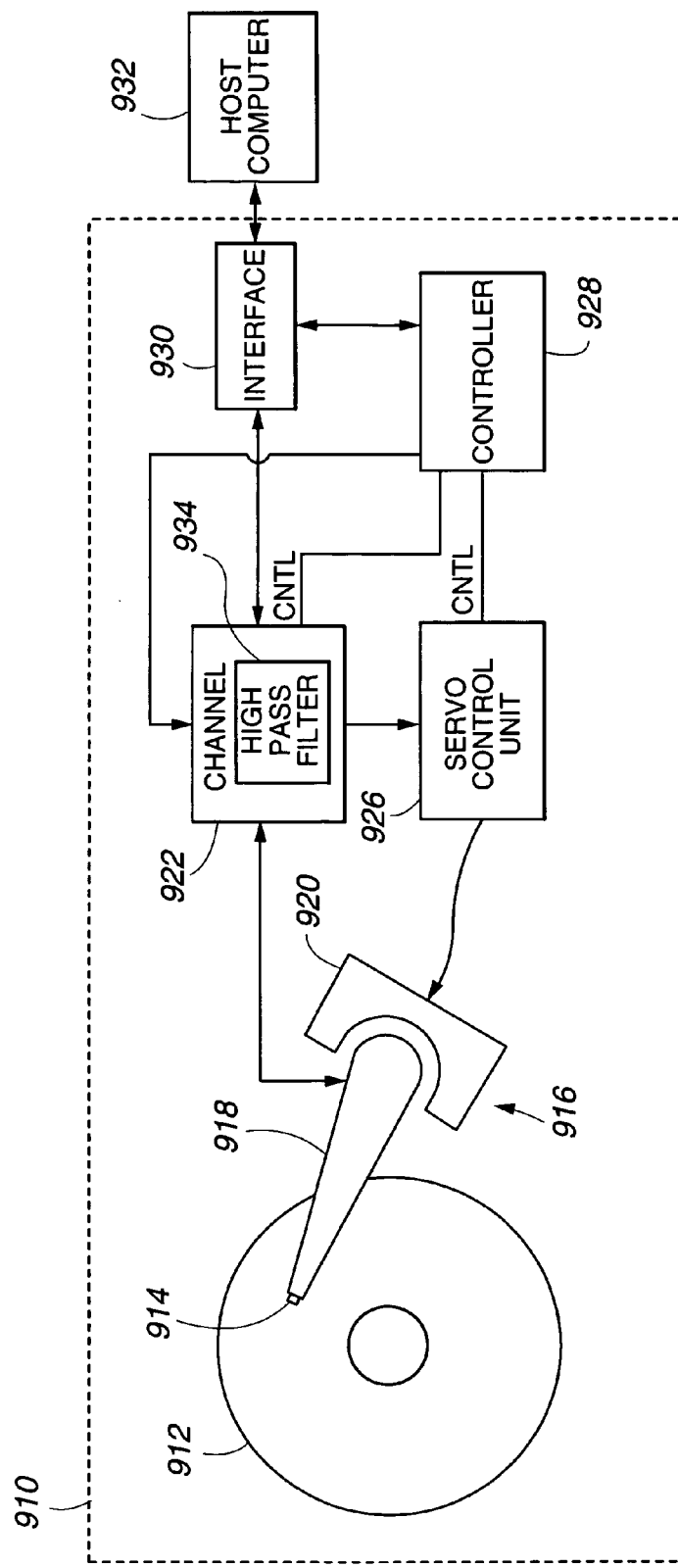
FIG. 11 is a block diagram showing one embodiment of a disk drive system of the present invention.

The present invention provides a head for use in a magnetic recording system, such as a disk drive. Referring to FIG. 11, a simplified electrical component block diagram of a disk drive system 910 is shown. The disk drive system 910 includes a disk 912; a head 914; and an actuator assembly 916, including an actuator arm 918 and a motor 920, such as a voice coil motor. The disk drive system 910 also includes a channel 922, a servo control 926, a controller unit 928 and an interface 930. The channel 922 includes a high pass filter 934 which is described more fully below.

During operation of the disk drive system 910, the disk 912 rotates. Data is stored on the disk 912 in substantially concentric tracks. Data may be read from or written to the disk 912 by moving the head 914 to the desired track and performing the desired communication operation, i.e., a read or write operation. In one embodiment described below, the disk 912 is a magnetic disk and the head 914 includes a magnetoresistive element that is capable of reading from the magnetic disk.

The actuator assembly 916, including the actuator arm 918 and the motor 920, receives servo control information from the servo control unit 926 to cause the motor to move the actuator arm 918 and, consequently, the head 914 when repositioning of the head 914 is required. In this regard, the head 914 may periodically read positioning information from the surface of the disk 912 and transmit the positioning information to the servo control unit 926 via the channel 922. The servo control unit 926 compares the present position of the head 914 to a desired position, with movement of the actuator arm 918 as required for proper track alignment.

The channel 922 receives a number of inputs for processing so that data may be manipulated by other devices internal and external, such as a host computer 932 interconnected with the interface 930, to the disk drive system 910. Among other things, the channel 922 is used to receive an analog read signal from the head 914, to filter the signal using the high pass filter 934 and to convert the analog signal to a digital signal recognized by the host computer 932. In addition, the channel 922 facilitates the storage of information from the host computer 932 to the disk 912 by encoding data signals from the host computer 932 and creating a write signal, from the encoded data, which is transmitted to the head 914 for storage on the disk 912.

The controller 928 controls the timing and operation of the other elements of the disk drive system 910. The controller 928 receives input/output requests from the host computer 932 via the interface unit 930. Based on input to the controller 928, the controller 928 delivers the appropriate commands to the servo control unit 926 and the channel 922. For example, in a read operation, the controller 928 commands the servo control unit 926 to move the head 914 to the desired track on the disk 912 so that the data written on the disk 912 may be transferred to the host computer 932. Accordingly, the servo control unit 926 moves the head 914 to the desired track using the servo positioning information read from the disk 912 by the head 914. In turn, the head 914 reads the information from the disk 912 and transmits the information to the channel 922 which filters and converts the information such that it may be interpreted by the host computer 932.

The head, of the present invention, includes a read element and a write element. In the present invention, the read element is capable reading magnetic polarity transitions written on the surface of a magnetic media, such as a magnetic disk. In addition, the read element of the present invention is capable of producing a readback signal that has a substantially Lorentzian-type pulse shape without the use of electronic signal processing. The write element is capable of writing magnetic polarity transitions on the surface of a magnetic media using vertical/perpendicular recording techniques rather than longitudinal recording techniques.

Figure 1:
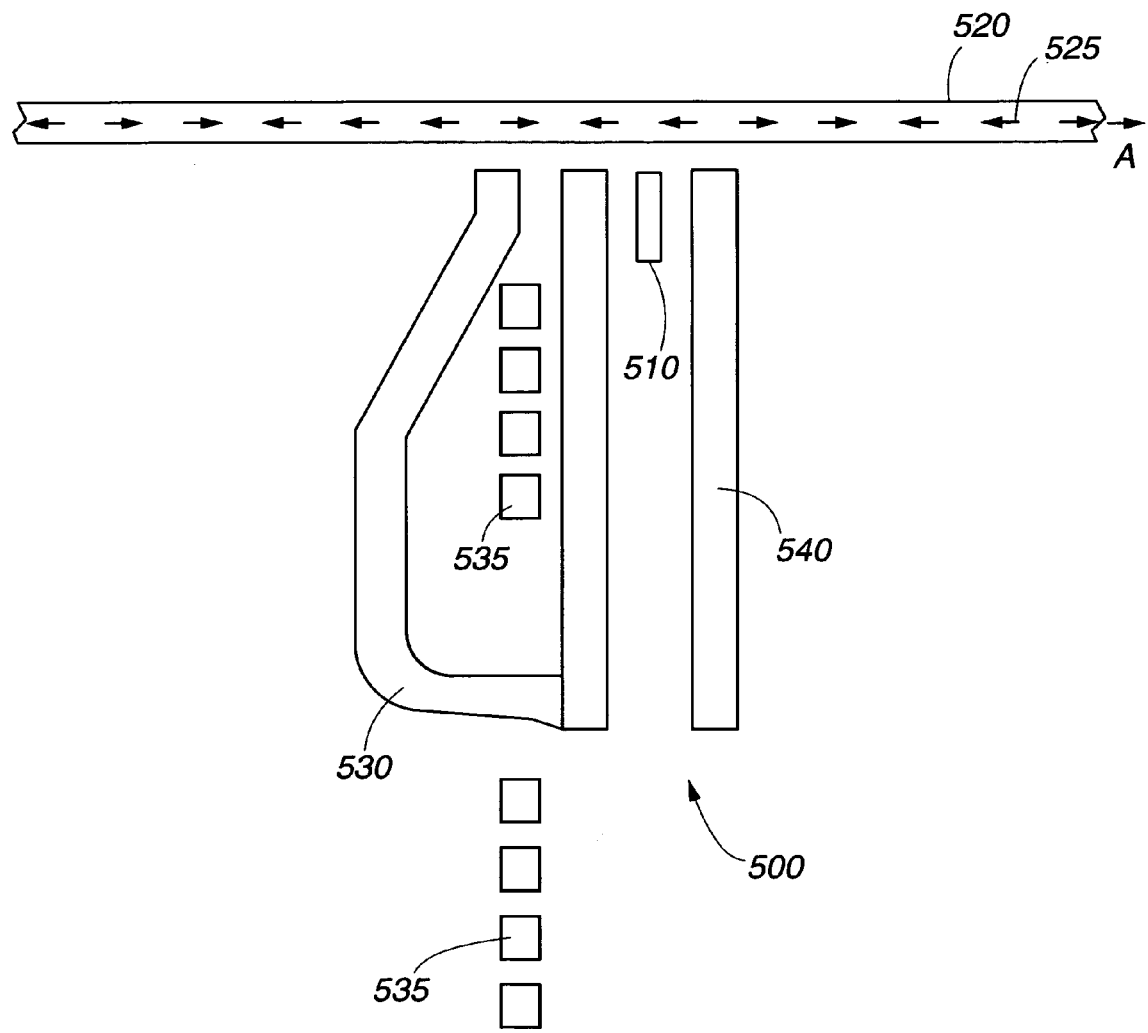
FIG. 1 is a diagrammatic representation of a cross-sectional view of a conventional head.
Figure 2:
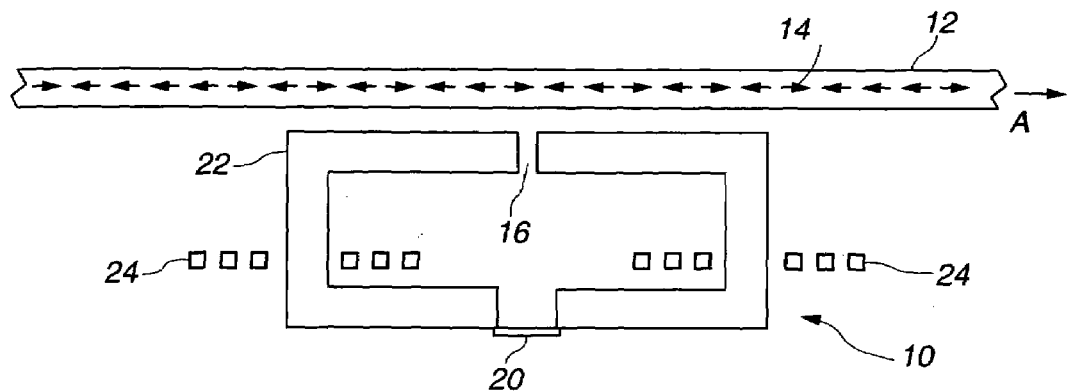
FIG. 2 shows a cross-sectional view of a conventional head having a yoke configuration for reading longitudinally-recorded transition data.
Figure 3:
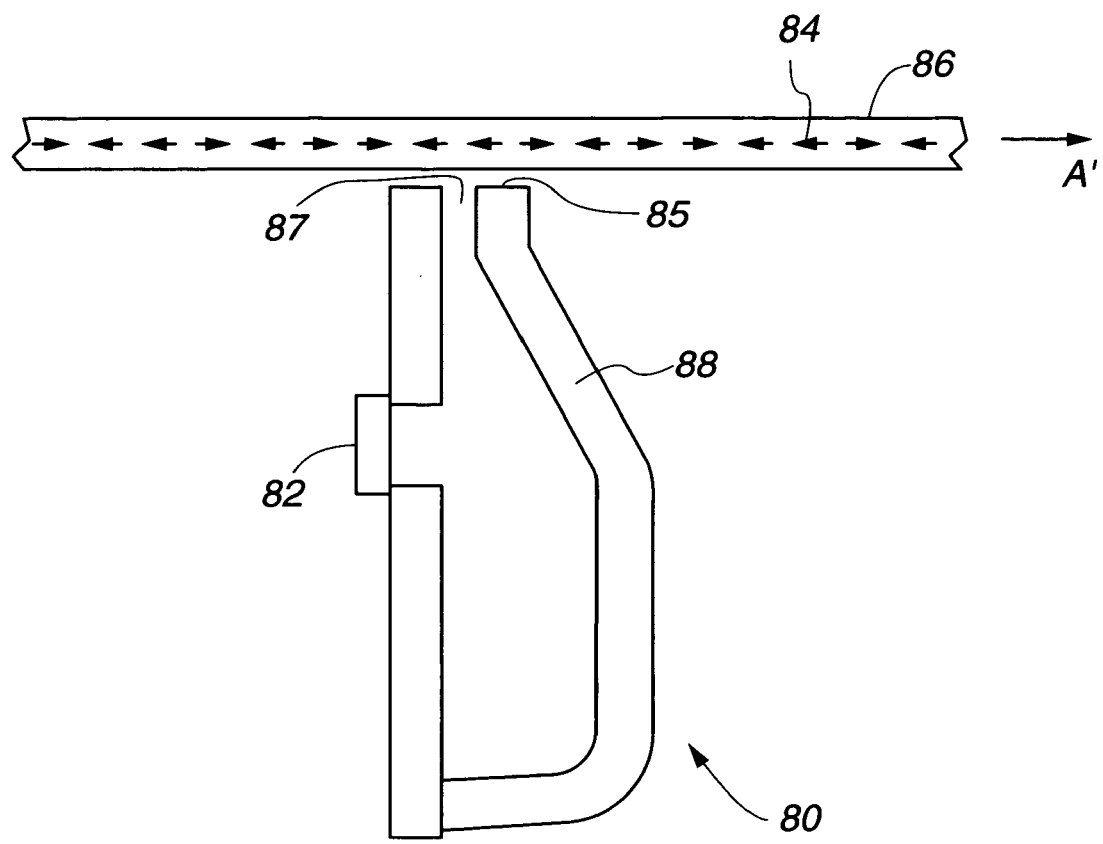
FIG. 3 shows a cross-sectional view of another conventional head having a yoke configuration for reading longitudinally-recorded transition data.

In conceiving the present invention, it was recognized that a non-ideal readback pulse was generated by conventional yoked MR heads because the magnetic transition data (referenced by numeral 14 in FIG. 2 and numeral 84 in FIG. 3) being read by the MR head (referenced by numeral 10 in FIG. 2 and numeral 80 in FIG. 3) were longitudinally written on the surface of the magnetic media. In contrast, the present invention provides a magnetic media having perpendicularly-recorded magnetic transition data thereon.

A perpendicular magnetic recording media typically consists of the combination of a magnetic underlayer and a recording media that is fabricated such that the orientation of the magnetic easy axis is perpendicular to the disk surface. Therefore, when a magnetic flux is produced along the orientation of the magnetic axis, perpendicular data transitions are written into the disk media. The combination of a perpendicular magnetic recording media and a flux-guided (yoked) MR head provides the advantages of producing a readback pulse signal that has a substantially Lorentzian-type pulse shape without the problems of thermal asperities, electrostatic discharge and element material corrosion. As a further advantage, the present invention does not suffer from the performance degradation associated with having to electronically process the readback pulse signal into a Lorentzian-type pulse.

Figure 6:
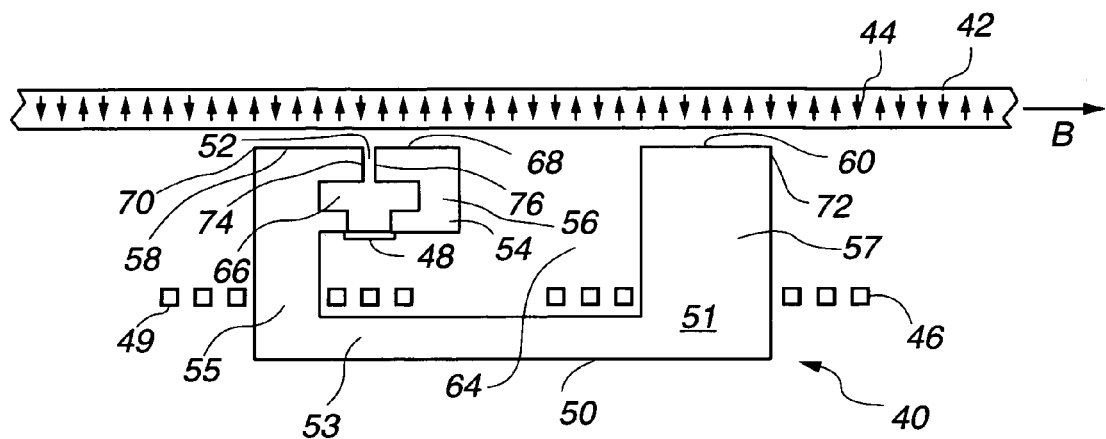
FIG. 6 shows a cross-sectional view of a first embodiment of the head of the present invention.

In one embodiment, as shown in FIG. 6, a flux-guided (yoked) head 40 is used to read information from and write information to a magnetic storage media 42. The information is written on the magnetic storage media 42 in the form of perpendicularly-recorded magnetic transition data 44. The flux-guided head 40 includes a read flux guide 56 preferably integral with and positioned within a write flux guide 51.

The write flux guide 51 includes a lower pole piece 53 positioned on a wafer surface 50. A leading flux conducting column 55 and a trailing flux conducting column 57 are interconnected to the lower pole piece 53 and separated by a surrounding insulator structure 64 to form a U-shaped structure. Write coils 49 and 46, respectively, surround leading and trailing flux conducting columns 55 and 57. In addition, the leading flux conducting column 55 terminates at a first pole piece 58, and the trailing flux conducting column 57 terminates at a third pole piece 60.

It should be noted that the first and third pole pieces 58 and 60, preferably, are substantially parallel with magnetic storage media 42. However, the present invention is not to be limited by the orientation of such surfaces with respect to the media 42. It should also be noted that the first and third pole pieces 58 and 60 also, respectively, function as first and second write poles. Further, the first pole piece 58 includes a leading edge portion 70 and the third pole piece 60 includes trailing edge portion 72.

The read flux guide 56 includes leading flux conducting column 55 and an inner flux conducting column 54 which is located between the leading flux conducting column 55 and the trailing flux conducting column 57. It should be appreciated that the leading flux conducting column 55 is shared between the write flux guide 51 and the read flux guide 56 in the present embodiment. The inner flux conducting column 54 is separated from the trailing flux conducting column 57 by the surrounding insulator structure 64, and the inner flux conducting column 54 is separated from the leading flux conducting column 55 by insulate material 66 and read gap 52. Additionally, the read gap 52 is defined by a first read pole 74 that is part of the leading flux conducting column 55 and a second read pole 76 that is part of the inner flux conducting column 54. An MR element 48 is used to connect the leading flux conducting column 55 with the inner flux conducting column 54. As noted above, the leading flux conducting column 55 terminates at the first pole piece 58. Similarly, the inner flux conducting column 54 terminates at a second pole piece 68, and in the preferred configuration, the second pole piece 68 is substantially parallel with the first and third pole pieces 58 and 60 and the magnetic storage media 42. Again, the invention is not to be limited by the preferred configuration.

The flux guided head 40, shown in FIG. 6, can be used in a magnetic recording system, such as a disk drive system (910 in FIG. 11), and can be used for writing data to and reading data from the magnetic storage media 42. In a preferred embodiment, the flux-guided head 40 is used in a disk drive system (910 in FIG. 11) having a magnetic media 42 or that includes a magnetic disk (912 in FIG. 11) having a plurality of concentric data tracks (not shown). The flux-guided head 40 is guided by an actuator arm (918 in FIG. 11) that is movably attached to a voice coil motor (920 in FIG. 11). As such, the voice coil motor (920 in FIG. 11) may be activated by a host computer (932 in FIG. 11) to move the actuator arm (918 in FIG. 11) and head 40 over the surface of the media 42. Typically, the magnetic media 42 is spun at high velocities in the direction of arrow B, such that the head 40, which has first, second and third pole pieces 58, 68 and 60 facing the media 42, floats above the media 42 on a small cushion of air or is in virtual low level contact with the media 42 around the area of the first, second and third pole pieces 58, 68 and 60. The data written to and read from the media 42 by the head 40 may be transferred to and from an external environment, such as a host computer (932 in FIG. 11). The head 40, of this embodiment of the present invention, is a dual element head having both a write element encompassing write flux guide 51 and a read element encompassing read flux guide 56.

As a magnetic flux flows through the MR element 48, the resistance of the MR element 48 changes, thus creating an analog signal that is proportional to the magnetic flux. In this embodiment, the analog signal sensed by the MR element 48 is proportional to the magnetic flux that is sensed by the read gap 52 and flows through read flux guide 56.

In this embodiment, the read flux guide 56 is physically smaller and positioned within the write flux guide 51. In addition, a portion of the leading flux conducting column 55 is shared between the read flux guide 56 and the write flux guide 51. However, based on the physical configuration of the flux-guided head 40, the shared portion of the leading flux conducting column 55 is relatively small. Therefore, very little magnetic flux that is generated in the read flux guide 56 during a read operation will enter the write flux guide 51, simply based on the physical geometry. In another embodiment, not shown, a non-magnetic spacer may be placed through the leading flux conducting column 55 (e.g., essentially splitting it) in order to prevent magnetic flux from entering the write flux guide 51 during a read operation.

The flux-guided head 40 is fabricated at the wafer level using planar fabrication techniques. Using planar fabrication techniques, the air bearing surfaces (in part, the first, second and third pole pieces 58, 68 and 60) can be defined during the fabrication process since these surfaces are the top layer deposited on the silicon wafer. Additionally, the read gap 52 and the air bearing surfaces (in part, the first, second and third pole pieces 58, 68 and 60) can be defined in the same masking step during fabrication and, thus, result in near perfect alignment of the read gap 52 and the first, second and third pole pieces 58, 68 and 60. In this regard, planar fabrication techniques provide an advantage over other techniques because the air bearing surfaces can be defined during fabrication of the head, and lapping or polishing of the surface is not required to form the air bearing surfaces.

In one aspect of this embodiment, the first, second and third pole pieces 58, 68 and 60 are substantially parallel. In addition, it should be noted that the read gap 52 defines a plane which is substantially parallel to the first, second and third pole pieces 58, 68 and 60. The read gap 52, of this embodiment, is approximately 0.1–0.2 μm in length. It should be appreciated, however, that the invention is not to be limited by the dimensions of read gap 52 and will be scaled down with increasing recording densities. The cross-section of the first pole piece 58 (first write pole) is typically 70% to 100% of the track pitch of the drive design. The third pole piece 60 (second write pole) can be of any size. However, the cross-sectional area at the third pole piece 60 (second write pole) is typically 10 to 100 times larger than the cross-sectional area of the first pole piece 58 (first write pole). In this design, the leading edge portion 70 of the first pole piece 58 is separated from the read gap 52 by approximately 2 to 3 μm.

Figure 6A:
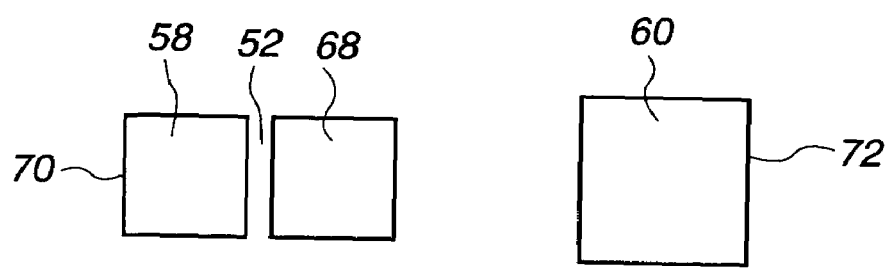
FIG. 6A shows the pole pieces of the head of FIG. 6 as viewed from the underlying magnetic media.

When viewing the first, second and third pole pieces 58, 68 and 60 from the surface of the magnetic media 42, as shown in FIG. 6A, preferably the first pole piece 58 has a constant width from the leading edge portion 70 to the read gap 52. In an alternative embodiment, the first pole piece 58 is tapered. In such an embodiment, the first pole piece 58 has a first width at the leading edge portion 70 and a second width at the read gap 52, wherein the first width is larger than the second width, typically, by about 20%. It is also possible to produce a read width narrower than the write width by making second pole piece 68 narrower than first pole piece 58, without a taper.

During a write operation, write coils 49 and 46 are energized to produce a magnetic flux within write flux guide 51. Magnetic flux lines flow from the first pole piece 58 (first write pole) to the third pole piece 60 (second write pole), or vice versa, depending on the direction of current flow through the write coils 46 and 49. The magnetic flux lines are used to induce or write perpendicularly-recorded magnetic transition data 44 onto the surface of the magnetic media 42. The head 40 configuration, as shown in FIG. 6, produces magnetic flux lines that emanate nearly perpendicular to the surface of the magnetic storage media 42 from the first and third pole pieces 58 and 60 (first and second write poles, respectively). As such, when the first and third pole pieces 58 and 60 are held closely to the magnetic storage media 42, the magnetic flux lines pass nearly perpendicularly through the magnetic media 42, as well. Therefore, the perpendicularly-recorded magnetic transition data 44 produced on the surface of the magnetic media 42 are aligned in a vertical or perpendicular orientation when compared to the first and third pole pieces 58 and 60, and the surface of the magnetic media 42.

During a read operation, the read gap 52 is held closely to the magnetic media 42 and, preferably, on a small cushion of air provided, in part, by the first, second and third pole pieces 58, 68 and 60 as the magnetic media 42 moves. The read gap 52 is held in such a manner that the surface of the magnetic media 42 is in a substantially parallel relationship to the first, second and third pole pieces 58, 68 and 60, as the magnetic media 42 is moved in the direction of arrow B past the read gap 52. In this embodiment, it should be noted that the magnetic media 42, as characterized in FIG. 6, moves longitudinally past the read gap 52 and first, second and third pole pieces 58, 68 and 60. In an alternative embodiment, the head 40 can be in virtual low level contact with the media 42 around the area of the first, second and third pole pieces 58, 68 and 60. In this alternative embodiment, a lubricant may be placed on the surface of the media 42 such that the head 40 makes contact with the lubricant rather than directly with the surface of the media 42.

As the perpendicularly-recorded magnetic transition data 44 longitudinally advance past the read gap 52, a magnetic flux is induced/generated in the read flux guide 56. The flux is then delivered to and sensed by the MR element 48. As mentioned above, the resistance of the magnetoresistive element 48 changes in response to a magnetic flux, and the magnetoresistive element 48 produces an analog signal (readback signal) proportional to the magnetic flux. Thus, as the perpendicularly-recorded magnetic transition data 44 generate a magnetic flux flow within the read flux guide 54, an analog signal is produced by the MR element 48 that is proportional to the perpendicularly-recorded magnetic transition data 44. The analog read signal has a substantially Lorentzian pulse shape, as shown in FIG. 7.

Figure 7:
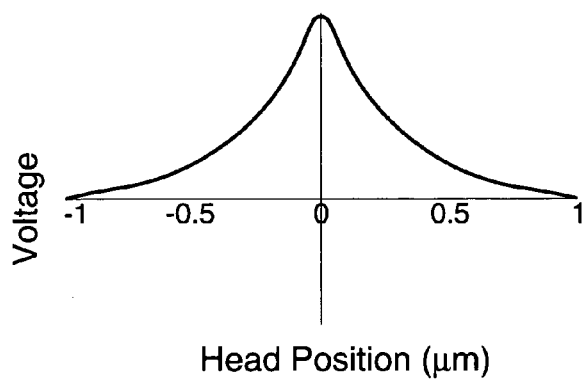
FIG. 7 shows a graph of a Lorentzian-like readback pulse generated by the head of the present invention.

The readback signal shown in FIG. 7 has a pulse shape with a peak near the zero head position. The pulse shape of the readback signal of FIG. 7 is comparable to the Lorentzian pulse shown in FIG. 5. It should be noted that a Lorentzian pulse shape is preferred because it is more easily detected by conventional detectors. A Lorentzian pulse shape is similar in shape to a class of target pulses that are desired by most conventional magnetic recording channels (922 in FIG. 11). This class of target pulses is called a class-4 partial response target pulse (PR4). Typically, PR4 detectors and peak detector circuits are specifically designed to detect Lorentzian-type target pulses. Although some detectors are able to respond to some variations of these target pulses, these variations are more similar to a Lorentzian pulse shape than to the step function shape shown in FIG. 4. Therefore, the Lorentzian pulse shape is more desirable than the step function shape because most conventional industry pulse detectors are specifically designed to detect Lorentzian pulse shapes.

Figure 5:
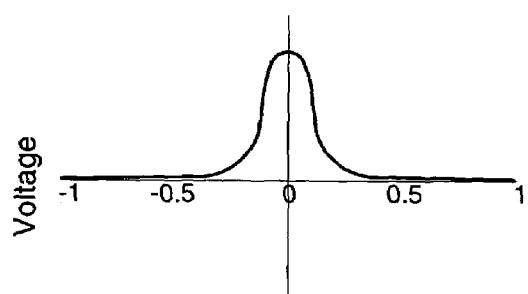
FIG. 5 shows a graph of an ideal readback pulse which has a Lorentzian shape.

The difference between the pulse shape of the readback signal of FIG. 7 and the Lorentzian pulse shape of FIG. 5 is that the pulse shape in FIG. 7 has higher amplitude values on either side of the peak. These higher amplitude values are shown in FIG. 7 where the readback signal at about 0.5 μm head position is well above 0 volts whereas in FIG. 5 the 0.5 μm head position has a voltage level of 0 volts. These higher amplitude values are known as tails to the peak. These tails or the higher amplitude values around the peak of FIG. 7 can be removed by a standard high pass filter (934 in FIG. 11) without significantly affecting channel performance.

Figure 4:
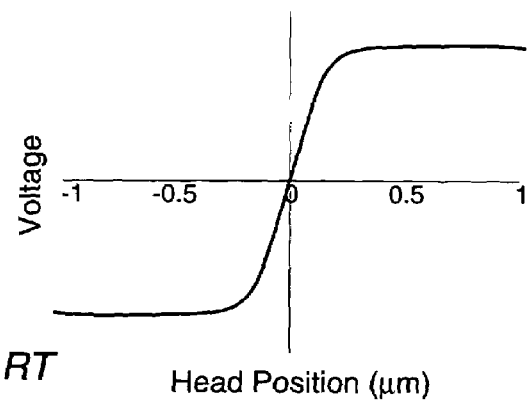
FIG. 4 shows a graph of a readback pulse generated by the conventional heads of FIGS. 2 and 3.

Thus, the pulse shape of the readback signal, as shown in FIG. 7, generated by the flux-guided head 40 of the present invention, can be passed through a high pass filter (934 in FIG. 11) to generate an almost ideal Lorentzian pulse shape, as shown in FIG. 5. In contrast, the pulse shape of the readback signal of conventional systems, as shown in FIG. 4, requires electronic differentiation using electronic signal processing to produce the Lorentzian pulse shape of FIG. 5. This differentiation typically induces a high noise level in the signal. In addition, since the differentiation requires additional circuitry, such circuity occupies valuable space in the disk drive unit.

The present invention produces a substantially Lorentzian pulse without the use of electronic signal processing. By passing the readback signal of the present invention through a standard high pass filter (934 in FIG. 11), the signal produced would have a nearly perfect Lorentzian pulse shape. In addition, a high pass filter (934 in FIG. 11) is, typically, included in most conventional channels (922 in FIG. 11). Therefore, added circuitry is not required in the disk drive system (910 in FIG. 11), and the use of a high pass filter (934 in FIG. 11) induces very little noise into the readback signal.

It should be noted, however, that the substantially Lorentzian pulse shape shown in FIG. 7 may be detected by most conventional detectors without the use of any filtering. The use of such a pulse shape without a high pass filter will depend on the requirements of the system, as will be noted by those skilled in the art.

Figure 10:
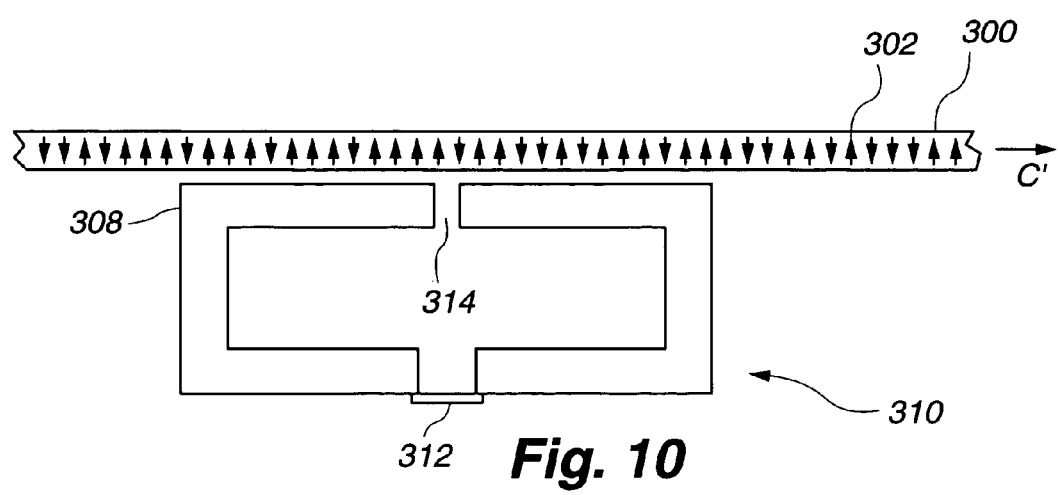
FIG. 10 shows a cross-sectional view of a fourth embodiment of the head of the present invention.

In another embodiment, as shown in FIG. 10, a flux-guided read head 310 can be formed separately from a write element (not shown). As previously mentioned with regard to FIG. 6, the flux-guided read head 310 can be used to read perpendicularly-recorded magnetic transition data 302 (that has been written on magnetic storage media 300) as the magnetic storage media 300 rotates or is moved in the direction of arrow C'. The flux-guided read head 310 includes read flux guide 308 that is separated by a read gap 314. In addition, an MR element 312 is embedded in the read flux guide 308. It should be appreciated by those skilled in the art that the flux-guided read head 310 and the read flux guide 308 operate and are fabricated similar to the flux-guided head 40 and the read flux guide 56 as explained with reference to FIG. 6.

Figure 8:
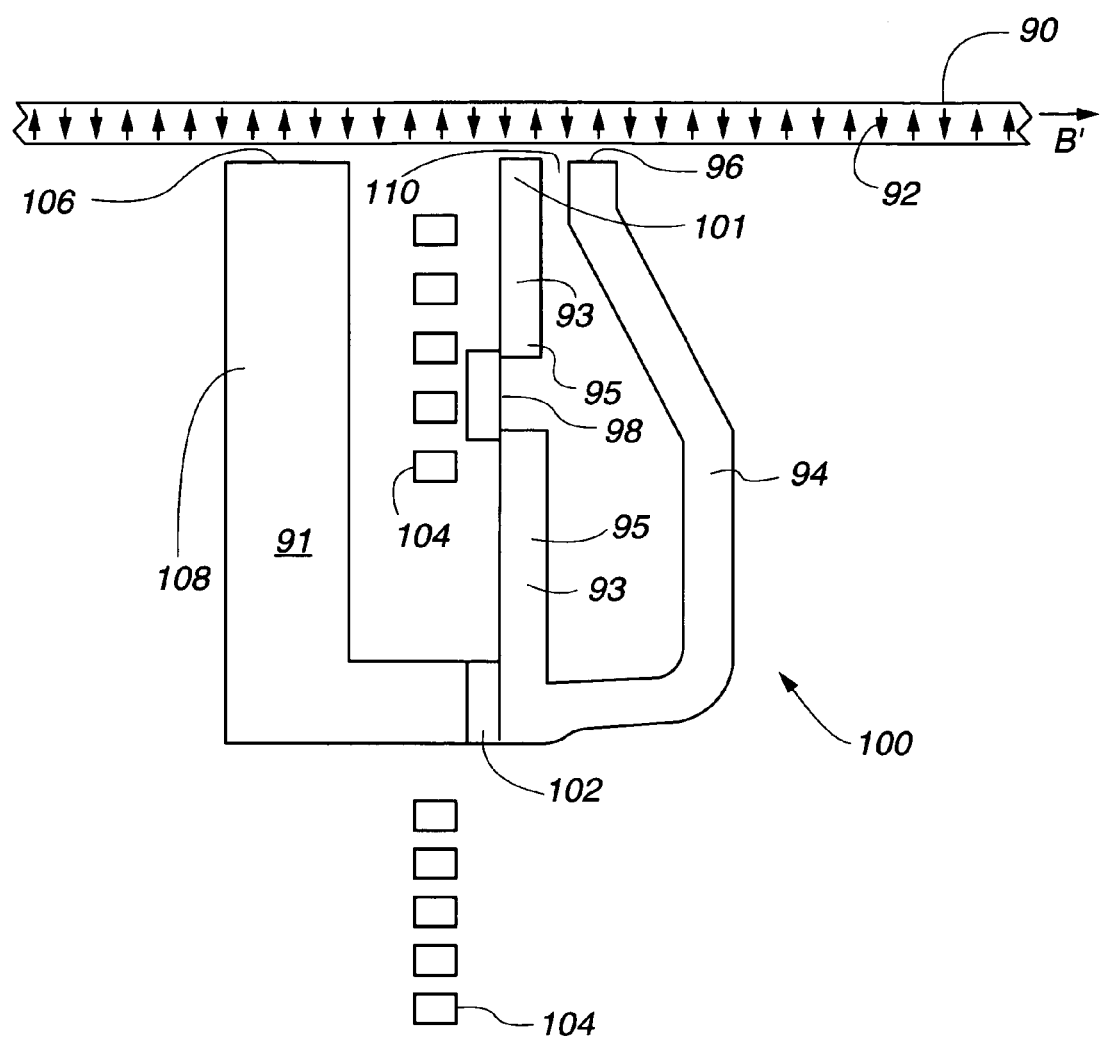
FIG. 8 shows a cross-sectional view of a second embodiment of the head of the present invention.

In yet another embodiment, as shown in FIG. 8, a flux-guided head 100 is used to read and write information on magnetic storage media 90 which is rotated or moved in the direction of arrow B'. The information on the magnetic storage media 90 is in the form of perpendicularly-recorded magnetic transition data 92. To read and write the perpendicularly-recorded magnetic transition data 92, the flux-guided head 100 includes a write flux guide 91 and a read flux guide 93.

The write flux guide 91 is comprised of leading flux conducting column 108 and trailing flux conducting structure 94 which terminate at first pole piece 106 and third pole piece 96, respectively. Further, the first and third pole pieces 106 and 96 also function as first and second write poles, respectively. The leading flux conducting column 108 and the trailing flux conducting structure 94 may composed of any material suitable for perpendicular recording, e.g., ferrite. The first and third pole pieces 106 and 96 are essentially parallel to each other and the magnetic media 90, and in this embodiment, the cross-sectional area of the leading flux conducting column 108 is 10 to 100 times larger than the cross-sectional area of the trailing flux conducting structure 94 (measured at the third pole piece 96). Write coils 104 are wrapped around the leading flux conducting column 108 and are energized during writing of data.

The read flux guide 93 includes trailing flux conducting structure 94 and an inner flux conducting column 95 which terminates at a second pole piece 101. The inner flux conducting column 95 is physically positioned between the leading flux conducting column 108 and the trailing flux conducting structure 94. A read gap 110 separates the trailing flux conducting structure 94 from the inner flux conducting column 95 and the second pole piece 101 from the third pole piece 96. An MR element 98 is embedded in the read flux guide 93.

In order to optimize the reader and writer and to prevent signal migration from the read flux guide 93 into write flux guide 91 or vice versa, a non-magnetic spacer 102 may be provided inside the write flux guide 91 to separate the write flux guide 91 from the read flux guide 93. Signal migration is of primary concern with the embodiment shown in FIG. 8 because the portion of the trailing flux conducting structure 94 that is shared between the read flux guide 93 and the write flux guide 91 is relatively large. Therefore in this geometry, the magnetic flux that is generated in the read flux guide 93 during a read operation has a higher tendency to enter the write flux guide 91. The non-magnetic spacer 102 can be any insulative material having any thickness but is, typically, 1 to 3 times the thickness of the read gap 110. In this embodiment, the read gap 110 can range from 0.1 to 0.2 μm in length.

In operation, when the write coils 104 are energized using a sufficiently high current, a magnetic flux is produced that can penetrate and pass through the non-magnetic spacer 102. Therefore, the non-magnetic spacer 102 does not prevent operation of the write flux guide 91.

Further, the non-magnetic spacer 102 ensures that a majority of the magnetic flux that flows through the read flux guide 93 during a read operation is delivered to the MR element 98. Additionally, if optimization is undesired and signal migration is not a problem, the non-magnetic spacer 102 may be eliminated.

In FIG. 8, the flux guided head 100 is typically fabricated at the wafer level using conventional, non-planar techniques. These conventional techniques require polishing and lapping of the air bearing surfaces (in part, the first, second and third pole pieces 106, 101 and 96) because these surfaces are not defined in the fabrication process.

It should be understood by those skilled in the art that the operation of flux-guided head 100 in FIG. 8 is similar to the flux-guided head 40 in FIG. 6. Therefore, the operation of the write flux guide 51 and the read flux guide 56 as explained with reference to FIG. 6 are similar to the operation of write flux guide 91 and read flux guide 93 illustrated in FIG. 8.

Figure 9:
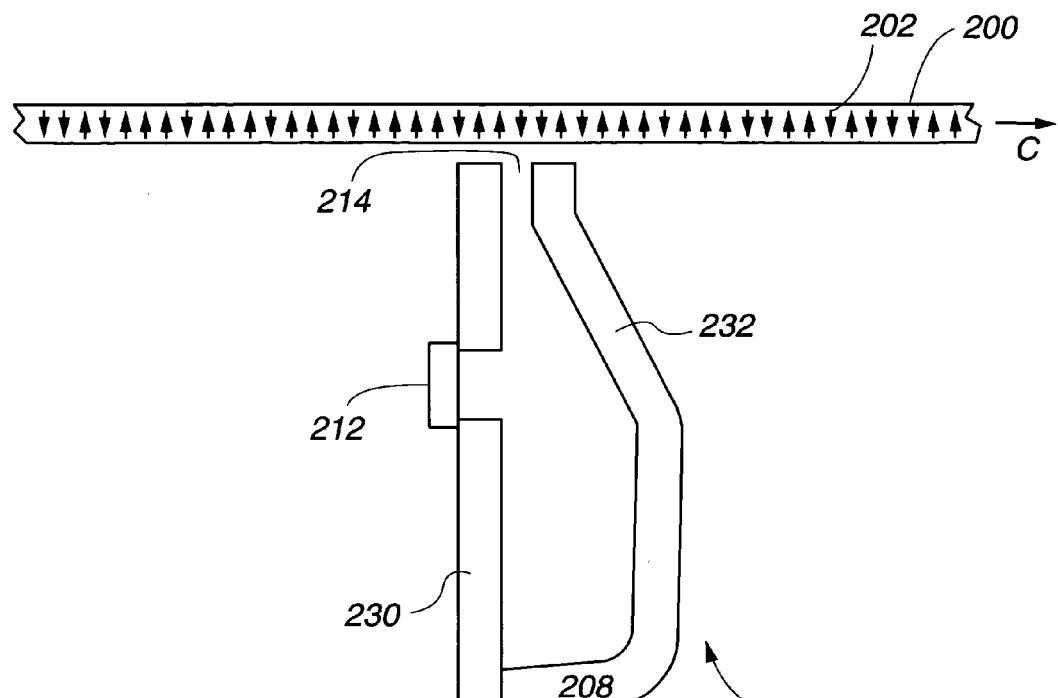
FIG. 9 shows a cross-sectional view of a third embodiment of the head of the present invention.

Another embodiment of the present invention is shown in FIG. 9. In this embodiment, a flux-guided read head 210 can be formed separately from a write element (not shown). As previously mentioned with regard to FIG. 8, the flux-guided read head 210 can be used to read perpendicularly-recorded magnetic transition data 202 (that has been written on magnetic storage media 200) as the magnetic storage media 200 rotates or is moved in the direction of arrow C. The flux-guided read head 210 includes read flux guide 208 having leading flux conducting column 230 and a trailing flux conducting structure 232 that are separated by a read gap 214. In addition, an MR element 212 is embedded in the leading flux conducting column 230. It should be appreciated by those skilled in the art that the flux-guided read head 210 and the read flux guide 208 operate and are fabricated similar to the flux-guided head 100 and the read flux guide 93 as explained with reference to FIG. 8.

The foregoing discussion of the invention has been presented for purposes of illustration and description. Further, the description is not intended to limit the invention to the form disclosed herein. For example, although the present invention is described in connection with disk drives, the present invention may also be used in connection with tape drives and the like. Consequently, variations and modifications commensurate with the above teachings, within the skill and knowledge of the relevant art, are within the scope of the present invention. The embodiments described herein and above are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A magnetic recording system including a head, a magnetic media with perpendicular magnetic polarity transitions written thereon and circuitry adapted to receive a readback pulse with a substantially Lorentzian pulse shape from said head and to detect said substantially Lorentzian pulse shape, said head for transferring data between the magnetic media and an exterior environment, wherein said head is a planar head, said head comprising:
   a write element for inducing said perpendicular magnetic polarity transitions into a surface of said magnetic media during a write operation;
   a yoke having a read gap for sensing said perpendicular magnetic polarity transitions; and
   a magnetoresistive read element mounted in a flux flow path of said yoke, wherein said magnetoresistive read element produces a readback pulse having a substantially Lorentzian pulse shape in response to one of said perpendicular magnetic polarity transitions.

2. A magnetic storage device comprising:
   a magnetic media having magnetic polarity transitions perpendicularly recorded thereon;
   a read element for reading said perpendicular magnetic polarity transitions, said read element including:
      a flux guide having a read gap, said read gap used for sensing said perpendicular magnetic polarity transitions and for producing a magnetic flux in said flux guide in response to each of said perpendicular magnetic polarity transitions, and
      a magnetoresistive element mounted in said flux guide for producing a readback pulse having a substantially Lorentzian pulse shape in response to said magnetic flux; and
   circuitry adapted to receive a readback pulse having a substantially Lorentzian pulse shape from said magnetoresistive element and to detect that said readback pulse has said substantially Lorentzian pulse shape, wherein said circuitry includes means for filtering said readback signal so that said readback signal has a greater resemblance to an ideal Lorentzian pulse shape.

3. A magnetic storage device comprising:
a magnetic storage media;
a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation; and
circuitry adapted for receiving readback pulses with substantially Lorentzian pulse shapes from said magnetoresistive read element, wherein said circuitry includes a detector designed to detect Lorentzian pulse shapes, and said detector is a peak detector.

4. A magnetic recording system including a head, a magnetic media with perpendicular magnetic polarity transitions written thereon and circuitry adapted to receive a readback pulse with a substantially Lorentzian pulse shape from said head and to detect said substantially Lorentzian pulse shape, said head for transferring data between the magnetic media and an exterior environment, said head comprising:
a write element for inducing said perpendicular magnetic polarity transitions into a surface of said magnetic media during a write operation, wherein said write element comprises first and second write poles, and said first and second write poles have first and second cross-sectional areas, respectively, said second cross-sectional area being larger than said first cross-sectional area;
a yoke having a read gap for sensing said perpendicular magnetic polarity transitions; and
a magnetoresistive read element mounted in a flux flow path of said yoke, wherein said magnetoresistive read element produces a readback pulse having a substantially Lorentzian pulse shape in response to one of said perpendicular magnetic polarity transitions.

5. The magnetic recording system, as claimed in claim 4, wherein said second cross-sectional area is about 10 to 100 times larger than said first cross-sectional area.

6. A magnetic recording system including a head, a magnetic media with perpendicular magnetic polarity transitions written thereon and circuitry adapted to receive a readback pulse with a substantially Lorentzian pulse shape from said head and to detect said substantially Lorentzian pulse shape, said head for transferring data between the magnetic media and an exterior environment, said head comprising:
a write element for inducing said perpendicular magnetic polarity transitions into a surface of said magnetic media during a write operation;
a yoke having a read gap for sensing said perpendicular magnetic polarity transitions, wherein said yoke includes first, second and third pole pieces in a common plane with said read gap, said common plane being defined by masking during fabrication; and
a magnetoresistive read element mounted in a flux flow path of said yoke, wherein said magnetoresistive read element produces a readback pulse having a substantially Lorentzian pulse shape in response to one of said perpendicular magnetic polarity transitions.

7. A magnetic recording system including a head, a magnetic media with perpendicular magnetic polarity transitions written thereon and circuitry adapted to receive a readback pulse with a substantially Lorentzian pulse shape from said head and to detect said substantially Lorentzian pulse shape, said head for transferring data between the magnetic media and an exterior environment, said head comprising:
a write element for inducing said perpendicular magnetic polarity transitions into a surface of said magnetic media during a write operation, wherein said write element comprises a write pole having a leading edge, said leading edge and said read gap are separated by a distance, and said leading edge of said write pole is separated from said read gap by about 2 to about 3 microns;
a yoke having a read gap for sensing said perpendicular magnetic polarity transitions; and
a magnetoresistive read element mounted in a flux flow path of said yoke, wherein said magnetoresistive read element produces a readback pulse having a substantially Lorentzian pulse shape in response to one of said perpendicular magnetic polarity transitions.

8. A magnetic recording system including a head, a magnetic media with perpendicular magnetic polarity transitions written thereon and circuitry adapted to receive a readback pulse with a substantially Lorentzian pulse shape from said head and to detect said substantially Lorentzian pulse shape, said head for transferring data between the magnetic media and an exterior environment, said head comprising:
a write element for inducing said perpendicular magnetic polarity transitions into a surface of said magnetic media during a write operation;
a yoke having a read gap for sensing said perpendicular magnetic polarity transitions, wherein a length of said read gap ranges from about 0.1 to about 0.2 microns; and
a magnetoresistive read element mounted in a flux flow path of said yoke, wherein said magnetoresistive read element produces a readback pulse having a substantially Lorentzian pulse shape in response to one of said perpendicular magnetic polarity transitions.

9. A magnetic storage device comprising:
a magnetic media having magnetic polarity transitions perpendicularly recorded thereon;
a read element for reading said perpendicular magnetic polarity transitions, said read element including:
a flux guide having a read gap, said read gap used for sensing said perpendicular magnetic polarity transitions and for producing a magnetic flux in said flux guide in response to each of said perpendicular magnetic polarity transitions, and
a magnetoresistive element mounted in said flux guide for producing a readback pulse having a substantially Lorentzian pulse shape in response to said magnetic flux;
a write element for writing said perpendicular magnetic polarity transitions on said magnetic media, said write element including:
first and second write poles having first and second ends, respectively, said first and second ends located proximate to a surface of said magnetic media, wherein said first and second write poles comprise first and second cross-sectional areas, respectively, said second cross-sectional area being larger than said first cross-sectional area, and
a coil element operatively coupled to said first and second write poles for writing to said magnetic media; and circuitry adapted to receive a readback pulse having a substantially Lorentzian pulse shape from said magnetoresistive element and to detect that said readback pulse has said substantially Lorentzian pulse shape.

10. The magnetic storage device, as claimed in claim 9, wherein said second cross-sectional area is about 10 to 100 times larger than said first cross-sectional area.

11. The magnetic storage device, as claimed in claim 9, wherein said write element is integral with said read element.

12. The magnetic storage device, as claimed in claim 9, wherein said read element is positioned within said write element.

13. The magnetic storage device, as claimed in claim 12, wherein said read element is physically smaller than said write element.

14. A magnetic storage device comprising:
a magnetic media having magnetic polarity transitions perpendicularly recorded thereon;
a read element for reading said perpendicular magnetic polarity transitions, said read element including:
a flux guide having a read gap, said read gap used for sensing said perpendicular magnetic polarity transitions and for producing a magnetic flux in said flux guide in response to each of said perpendicular magnetic polarity transitions, and
a magnetoresistive element mounted in said flux guide for producing a readback pulse having a substantially Lorentzian pulse shape in response to said magnetic flux;
a write element for writing said perpendicular magnetic polarity transitions on said magnetic media, said write element including:
first and second write poles having first and second ends, respectively, said first and second ends located proximate to a surface of said magnetic media,
a coil element operatively coupled to said first and second write poles for writing to said magnetic media, and
a non-magnetic spacer for substantially preventing flux flow through said write element during a read operation; and
circuitry adapted to receive a readback pulse having a substantially Lorentzian pulse shape from said magnetoresistive element and to detect that said readback pulse has said substantially Lorentzian pulse shape.

15. A magnetic storage device comprising:
a magnetic storage media;
a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation; and
circuitry adapted for receiving readback pulses with substantially Lorentzian pulse shapes from said magnetoresistive read element, wherein said circuitry includes a detector designed to detect Lorentzian pulse shapes, and said detector is a class-4 partial response (PR4) detector.

16. A magnetic storage device comprising:
a magnetic storage media;
a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation; and
circuitry adapted for receiving readback pulses with substantially Lorentzian pulse shapes from said magnetoresistive read element, wherein said circuitry includes a detector designed to detect Lorentzian pulse shapes, and said circuitry includes a high pass filter that receives said readback pulses and provides filtered readback pulses, which more closely resemble ideal Lorentzian pulse shapes than said readback pulses, to said detector.

17. A magnetic storage device comprising:
a magnetic storage media;
a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation; and
circuitry adapted for receiving readback pulses with substantially Lorentzian pulse shapes from said magnetoresistive read element, wherein said circuitry includes a detector designed to detect Lorentzian pulse shapes;
wherein said magnetic storage device is devoid of a high pass filter between said magnetoresistive read element and said detector.

18. A magnetic storage device comprising:
a magnetic storage media;
a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation; and
circuitry adapted for receiving readback pulses with substantially Lorentzian pulse shapes from said magnetoresistive read element, wherein said circuitry includes a detector designed to detect Lorentzian pulse shapes;
wherein said magnetic storage device is devoid of a differentiator between said magnetoresistive read element and said detector.

19. A magnetic storage device comprising:
a magnetic storage media;
a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation; and circuitry adapted for receiving readback pulses with substantially Lorentzian pulse shapes from said magnetoresistive read element, wherein said circuitry includes a detector designed to detect Lorentzian pulse shapes;

wherein said magnetic storage device is devoid of signal processing circuitry between said magnetoresistive read element and said detector.

20. A magnetic storage device comprising:

a magnetic storage media;

a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation, wherein said yoke includes a write flux guide that provides a write gap and a read flux guide that provides a read gap, said read flux guide is integral with and positioned within said write flux guide, said yoke includes first, second and third pole pieces, said first and third pole pieces are in said write flux guide and provide write poles that define said write gap, said first and second pole pieces are in said read flux guide and provide read poles that define said read gap, and said first, second and third pole pieces are substantially aligned with one another and define a plane that is substantially parallel to a top surface of said magnetic storage media; and circuitry adapted for receiving readback pulses with substantially Lorentzian pulse shapes from said magnetoresistive read element, wherein said circuitry includes a detector designed to detect Lorentzian pulse shapes.

21. A magnetic storage device comprising:

a magnetic storage media;

a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation, wherein said yoke includes a write flux guide that provides a write gap and a read flux guide that provides a read gap, said read flux guide is integral with and positioned within said write flux guide, said yoke includes first, second and third pole pieces, said first and third pole pieces are in said write flux guide and provide write poles that define said write gap, said first and second pole pieces are in said read flux guide and provide read poles that define said read gap, and said yoke includes a non-magnetic spacer in said write flux guide that prevents magnetic flux from circulating through said write flux guide during a read operation; and circuitry adapted for receiving readback pulses with substantially Lorentzian pulse shapes from said magnetoresistive read element, wherein said circuitry includes a detector designed to detect Lorentzian pulse shapes.

22. A magnetic storage device comprising:

a magnetic storage media;

a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation, wherein said yoke includes a write flux guide that provides a write gap and a read flux guide that provides a read gap, said read flux guide is integral with and positioned within said write flux guide, said yoke includes first, second and third pole pieces, said first and third pole pieces are in said write flux guide and provide write poles that define said write gap, said first and second pole pieces are in said read flux guide and provide read poles that define said read gap, and said first, second and third pole pieces are part of an air bearing surface that floats above said magnetic storage media on a small cushion of air during read and write operations; and circuitry adapted for receiving readback pulses with substantially Lorentzian pulse shapes from said magnetoresistive read element, wherein said circuitry includes a detector designed to detect Lorentzian pulse shapes.

23. A magnetic storage device comprising:

a magnetic storage media;

a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation, wherein said yoke includes a write flux guide that provides a write gap and a read flux guide that provides a read gap, said read flux guide is integral with and positioned within said write flux guide, said yoke includes first, second and third pole pieces, said first and third pole pieces are in said write flux guide and provide write poles that define said write gap, said first and second pole pieces are in said read flux guide and provide read poles that define said read gap, and said first, second and third pole pieces contact a lubricant on a top surface of said magnetic storage media during read and write operations; and circuitry adapted for receiving readback pulses with substantially Lorentzian pulse shapes from said magnetoresistive read element, wherein said circuitry includes a detector designed to detect Lorentzian pulse shapes.

24. A magnetic storage device comprising:

a magnetic storage media;

a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation, wherein said yoke includes a write flux guide that provides a write gap and a read flux guide that provides a read gap, said read flux guide is integral with and positioned within said write flux guide, said yoke includes first, second and third pole pieces, said first and third pole pieces are in said write flux guide and provide write poles that define said write gap, said first and second pole pieces are in said read flux guide and provide read poles that define said read gap, and said head includes write coils disposed between said first and third pole pieces but not between said first and second pole pieces; and circuitry adapted for receiving readback pulses with substantially Lorentzian pulse shapes from said magnetoresistive read element, wherein said circuitry includes a detector designed to detect Lorentzian pulse shapes.

25. A magnetic storage device comprising:

a magnetic storage media;

a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation, wherein said yoke includes a write flux guide that provides a write gap and a read flux guide that provides a read gap, said read flux guide is integral with and positioned within said write flux guide, said yoke includes first, second and third pole pieces, said first and third pole pieces are in said write flux guide and provide write poles that define said write gap, said first and second pole pieces are in said read flux guide and provide read poles that define said read gap, and said head includes write coils disposed between said first and second pole pieces; and circuitry adapted for receiving readback pulses with substantially Lorentzian pulse shapes from said magnetoresistive read element, wherein said circuitry includes a detector designed to detect Lorentzian pulse shapes.

26. A tape drive comprising:

a magnetic storage media;

a head including a write element for inducing perpendicular magnetic polarity transitions in said magnetic storage media during a write operation, a yoke, and a magnetoresistive read element mounted in a flux flow path of said yoke and recessed from said magnetic storage media for producing readback pulses with substantially Lorentzian pulse shapes in response to and in one-to-one correspondence with said perpendicular magnetic polarity transitions during a read operation; and circuitry adapted for receiving readback pulses with substantially Lorentzian pulse shapes from said magnetoresistive read element, wherein said circuitry includes a detector designed to detect Lorentzian pulse shapes.

* * * * *